(12) United States Patent
Korol et al.

(10) Patent No.: US 8,497,597 B2
(45) Date of Patent: *Jul. 30, 2013

(54) TWO-WIRE POWER AND COMMUNICATIONS FOR IRRIGATION SYSTEMS

(75) Inventors: Alex Korol, Diamond Bar, CA (US); Eduardo Fregoso, Mira Loma, CA (US)

(73) Assignee: The Toro Company, Bloomington, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 13/609,152

(22) Filed: Sep. 10, 2012

(65) Prior Publication Data

US 2013/0002012 A1    Jan. 3, 2013

Related U.S. Application Data

(63) Continuation of application No. 12/763,893, filed on Apr. 20, 2010, now Pat. No. 8,274,171.

(60) Provisional application No. 61/171,027, filed on Apr. 20, 2009, provisional application No. 61/171,015, filed on Apr. 20, 2009.

(51) Int. Cl.
*H02J 1/00* (2006.01)

(52) U.S. Cl.
USPC .............................................................. 307/1

(58) Field of Classification Search
USPC .............................................................. 307/1
See application file for complete search history.

(56) References Cited

U.S. PATENT DOCUMENTS

| | | |
|---|---|---|
| 3,521,130 A | 7/1970 | Davis et al. |
| 3,522,570 A | 8/1970 | Wanaselja |
| 3,578,245 A | 5/1971 | Brock |
| 3,723,827 A | 3/1973 | Griswold et al. |
| 4,009,422 A | 2/1977 | Woodfill |
| 4,241,375 A | 12/1980 | Ruggles |
| 4,851,946 A | 7/1989 | Igarashi et al. |
| 5,122,921 A | 6/1992 | Koss |
| 5,500,782 A | 3/1996 | Oertel et al. |
| 5,606,349 A | 2/1997 | Droit et al. |
| 5,808,850 A | 9/1998 | Carpenter, Jr. |
| 5,936,824 A | 8/1999 | Carpenter, Jr. |
| 7,358,626 B2 | 4/2008 | Gardner et al. |
| 8,108,078 B2* | 1/2012 | Lorenz .......................... 700/284 |
| 8,274,171 B2* | 9/2012 | Korol et al. ....................... 307/1 |

OTHER PUBLICATIONS

United States Patent and Trademark Office, Notice of Allowance mailed May 25, 2012 in U.S. Appl. No. 12/763,893, 6 pages.

* cited by examiner

*Primary Examiner* — Robert L. Deberadinis
(74) *Attorney, Agent, or Firm* — Inskeep IP Group, Inc.

(57) ABSTRACT

A two-wire power and communication system is provided, having a decoder that draws a constant amount of current for communication signals despite changes in the voltage on the power and communication wires. In one example, decoders have a constant current sink circuit that includes a shunt regulator that controls a field effect transistor.

19 Claims, 5 Drawing Sheets

TWO-WIRE POWER AND COMMUNICATIONS FOR IRRIGATION SYSTEMS

RELATED APPLICATIONS

This application is a continuation of U.S. patent application Ser. No. 12/763,893 filed Apr. 20, 2010 entitled Two-Wire Power And Communications For Irrigation Systems, issuing on Sep. 25, 2012 as U.S. Pat. No. 8,274,171, which claims priority to U.S. Provisional Application Ser. No. 61/171,027 filed Apr. 20, 2009 entitled Constant Current ACK Pulse For Two-Wire Decoder, and to U.S. Provisional Application Ser. No. 61/171,015 filed Apr. 20, 2009 entitled Surge Protection For Two-Wire Decoder, the contents of all of which are incorporated in their entireties herein.

BACKGROUND OF THE INVENTION

Large commercial irrigation systems such as those used on golf courses or croplands use sprinklers, sensors or other components that are normally powered from 24 V AC power lines that can be several miles long and can serve many hundreds of components. Various systems have been proposed for powering and controlling the components of such a system with just two wires. For example, U.S. Pat. No. 3,521,130 to Davis et al., U.S. Pat. No. 3,723,827 to Griswold et al., and U.S. Pat. No. 4,241,375 to Ruggles disclose systems in which sprinkler valves along a cable are turned on in sequence by momentarily interrupting the power or transmitting an advance signal from time to time.

A problem with this approach is that it does not allow the operator to freely turn on or off any selected sprinkler or set of sprinklers at different times. This problem is typically resolved by providing separate controllers in the field to operate groups of sprinklers in accordance with a program stored in them, or transmitted to them by radio or other means. Alternatively, it has been proposed, as for example in U.S. Pat. No. 3,578,245 to Brock, to operate individual sprinkler sets from a central location by superimposing a frequency-modulated signal or DC pulses onto the 24 V AC power line.

All of these approaches are expensive. For example, a system with hundreds of sprinklers requires miles of expensive, heavy wiring to accommodate the current drawn by a large number of valves that may be watering simultaneously. Also, heavy use of D.C. current may cause electrolysis issues with electrical components.

One alternative to these traditional irrigation systems are two-wire power and communications systems, such as the system shown in U.S. application No. 7,358,626, the contents of which are incorporated by reference. In such systems, two wires supply both A.C. power and digital control communications from a controller to a plurality of decoders.

While these A.C. power and digital communication systems generally work well, they also have several disadvantages. First, decoder circuitry that listens for communications are sensitive to power surges by lightning. Hence, expensive, external surge devices with ground rods must be installed at short intervals along the power and communication wires.

Second, some two wire power and communication systems use bursts of current by valve or sensor decoders to acknowledge or otherwise communicate with a central controller. These decoders relied on fixed resistor circuits to switch to a circuit path with a resistor between the common current and ground on the decoder. Since these resistor circuits resist at a fixed value, any reduction in the voltage causes a proportional reduction in the current pulse (e.g., due to Ohm's Law). Therefore if the current burst of the acknowledgement pulse is reduced sufficiently, the gateway 16 will not recognize it and therefore will falsely determine that the decoder did not receive a command. As decoders are installed further away from a gateway or central controller, the resistance of the power and communication wires becomes significant and reduces the voltage available across the decoder. Additionally, large numbers of decoders may also further reduce voltage and increase resistance on the power and communication wires. Hence, these systems effectively become limited in size and in the number of decoders.

SUMMARY OF THE INVENTION

In one aspect of the present invention, a two-wire power and communication system is provided, having a decoder that draws a constant amount of current for communication signals despite changes in the voltage on the power and communication wires. In one example, decoders have a constant current sink circuit that includes a shunt regulator that controls a field effect transistor.

In another aspect of the present invention, the number of external surge protection devices are reduced or eliminated by bypassing the sensitive decoder components of each decoder with surge protection circuits. Each surge protection circuit connects to a path in communication with the two power and communications wires, as well as paths connecting to each valve or sensor control wire (e.g., power wires connecting to a solenoid valve). In this respect, fewer external surge protection devices are required, reducing the cost of installation while decreasing surge-related damage (e.g., from lightning).

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which.

DESCRIPTION OF EMBODIMENTS

Figure 1:
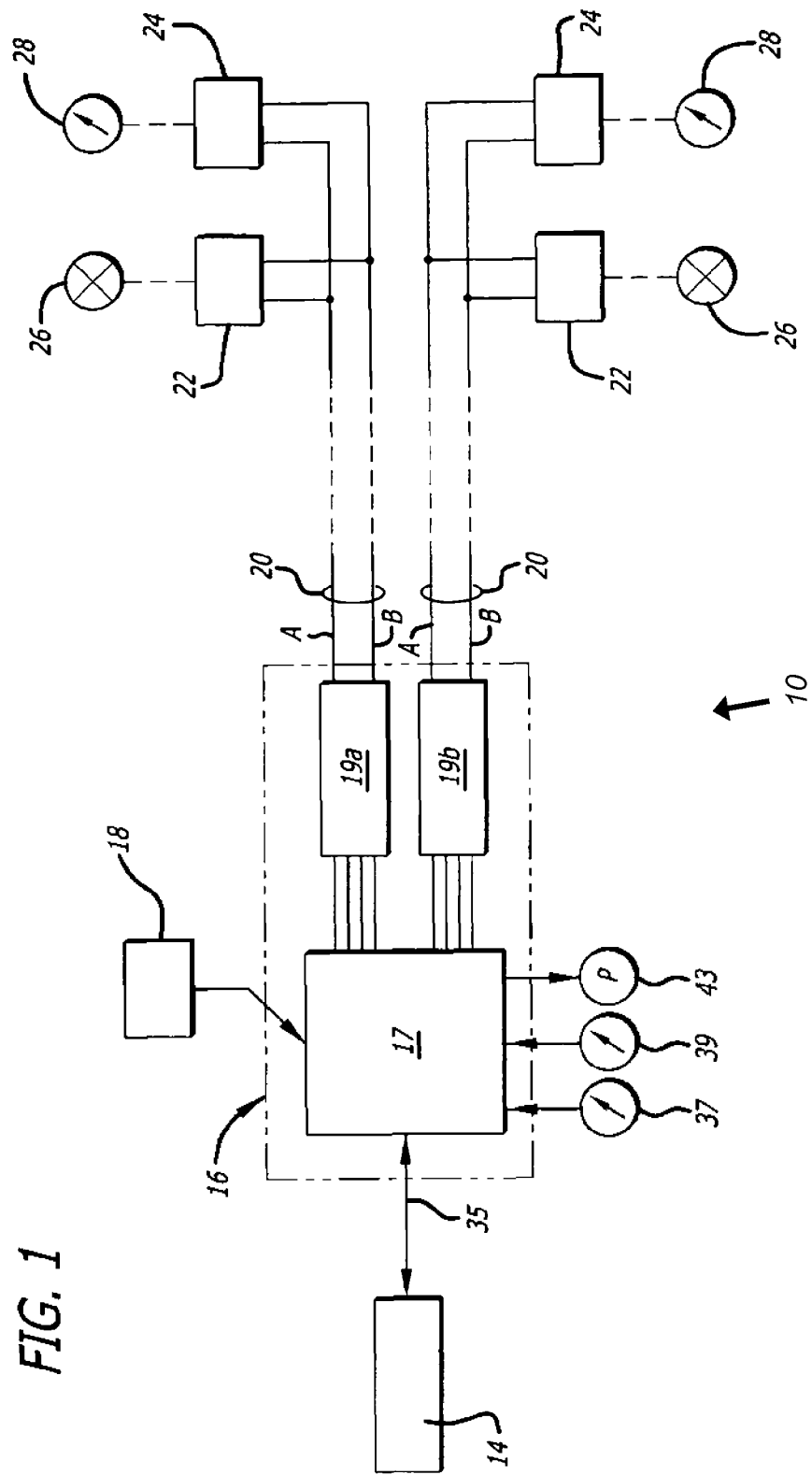
FIG. 1 illustrates a two-wire power and communication irrigation system according to the present invention.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

FIG. 1 illustrates an overview of a two-wire power and communication system 10 according to the present invention.

A controller 14, such as a PC or stand-alone irrigation controller, is used to program irrigation schedules and to monitor sensor data from the system 10.

A gateway 16 (i.e., a communication interface) is in communication with the controller 14 via communication connection 35 and transmits acknowledgments or other device information (e.g., from sensors 37, 39 and 43; watering station decoders 22; or sensor decoders 24) to the controller 14. Additionally, the gateway 16 transmits communication data such as commands (e.g., open or close a valve) to specific device decoders such as watering station decoders 22 and sensor decoders 24

In one example embodiment, the gateway 16 contains a motherboard 17 and a pair of daughterboards 19a and 19b that receive power from a power source 18. Each of the daughterboards 19a, 19b selectively applies potentials to wires A and B of their respective cables 20 (e.g., 1. +40 V on A with respect to B; 2. +40 V on B with respect to A; or 3. an equal potential on both A and B). The daughterboards 19a, 19b are also equipped to detect current drawn by the decoders of the system, and to report that information to the control unit 14 through the motherboard 17. Device decoders such as watering station decoders 22 and sensor decoders 24 are connected in parallel to the wires A and B, and are arranged to operate the system components (e.g. water valves 26 or sensors 28) connected to them.

Note that while wires A and B (i.e., a wire pair) are described as two, single wires, it should be understood that these wires can be made up of multiple wires connected together in series. In other words, wires A and B refer to two different conductive, electrical paths.

An example protocol for the operation of the system of this invention is illustrated in FIGS. 2a-d. In this example, the daughterboards 19a, b impress a square wave 53 alternating between +40 V (A positive with respect to B) and −40 V (B positive with respect to A) across their respective outputs A and B at a 60 Hz rate. This provides a square-wave power supply (FIG. 2a) to all the decoders 22, 24 along the cable 20. As pointed out below, the decoders 26, 28 can use power of either polarity. Because the time of the circuit at one polarity is generally equal to its time at the other polarity, electrolysis problems are minimized.

Figure 2B:
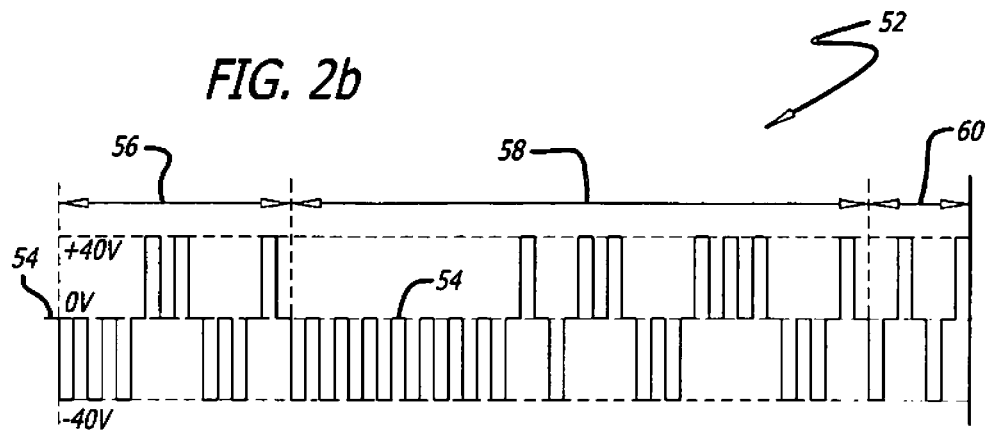
FIGS. 2a-2d illustrates example communication protocols according to the present invention.
Figure 2C:
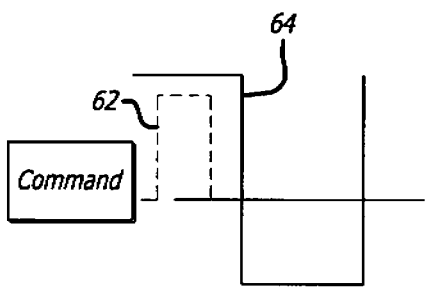
Figure 2A:
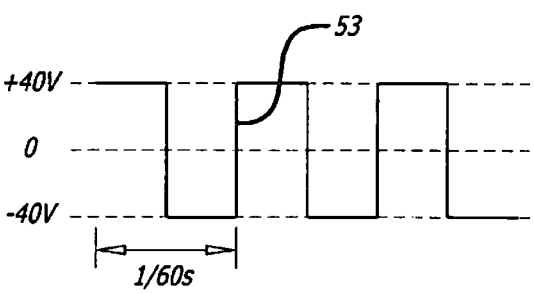
Figure 2D:
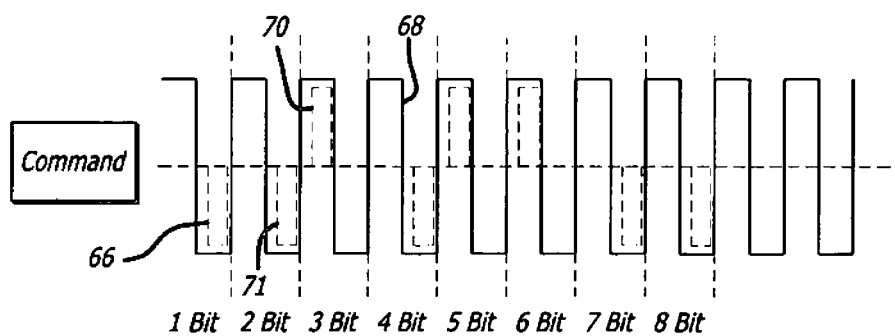

If it is now desired to actuate a specific sprinkler or sensor, the command pulse train 52 shown in FIG. 2b is transmitted. The command train begins with a no-power segment 54 in which the wires A and B are both grounded for $\frac{1}{120}$ second. This is followed, in the preferred embodiment, by eight pulses 56 separated by similar no-power segments or delimiters 54. The pulses 56 may be either +40 V (signifying a "1") or −40 V (signifying a "0"). Taken together, the pulses 56 define the desired runtime (in minutes) of the device now to be selected.

The next twenty pulses 58, again separated by no-power delimiters 54, define the address of the desired device 26 or 28. Next, the nature of the desired command is specified by the four pulses 60. The command pulse train 52 illustrated in FIG. 2b may, for example, convey the command "Turn Station 3 of decoder 2873 on for 25 minutes". Upon completion of the command pulse train, the microprocessor returns control of the wires A and B to the power relays. The output of gateway 16 thus resumes the square-wave format of FIG. 2a.

If a selected decoder 26 has received and understood the command (see FIG. 2c), it sends an acknowledgment signal by momentarily drawing a high current burst 62 during the +40 V portion of the first square wave 64 following the command pulse train. This is detected by a current sensor of the gateway 16 and constitutes an acknowledgement that the decoder has received its instruction. If no current is detected during the first square wave 64, a control failure is indicated, and the microprocessor may transmit an alarm to the control device 14.

If the addressed device was a sensor decoder 28 (see FIG. 2d), the chosen decoder responds with current bursts 66 during the eight (in the preferred embodiment) square waves 68 following the command train. In each of these square waves, a current burst 70 during the +40 V portion transmits a "1" to the gateway 16, while a current burst 71 during the −40 V portion transmits a "0". As in the case of a station decoder 26, the lack of any current burst during a square wave 68 indicates a system failure and may trigger an alarm. Additional operational details of this system can generally be found in U.S. application No. 7,358,626, the contents of which are incorporated by reference.

In prior art two wire power and communication systems, the previously described current bursts or current pulses are generated by using a transistor to switch to a circuit path with a resistor between the common current and ground on the decoder. In this respect, this resistor circuit creates current bursts.

These prior art decoders work relatively well when wired close to the gateway 16. However, when these decoders are installed further away from the gateway 16, the resistance of the communication wire A and B becomes significant and reduces the voltage available across the decoder (e.g., 22 or 24). Since this prior art resistor circuit is a fixed resistance value, any reduction in the voltage causes a proportional reduction in the current pulse (e.g., due to Ohm's Law). Therefore if the current burst of the acknowledgement pulse is reduced sufficiently, the gateway 16 will not recognize it and therefore will falsely determine that the decoder did not receive a command.

Figure 3:
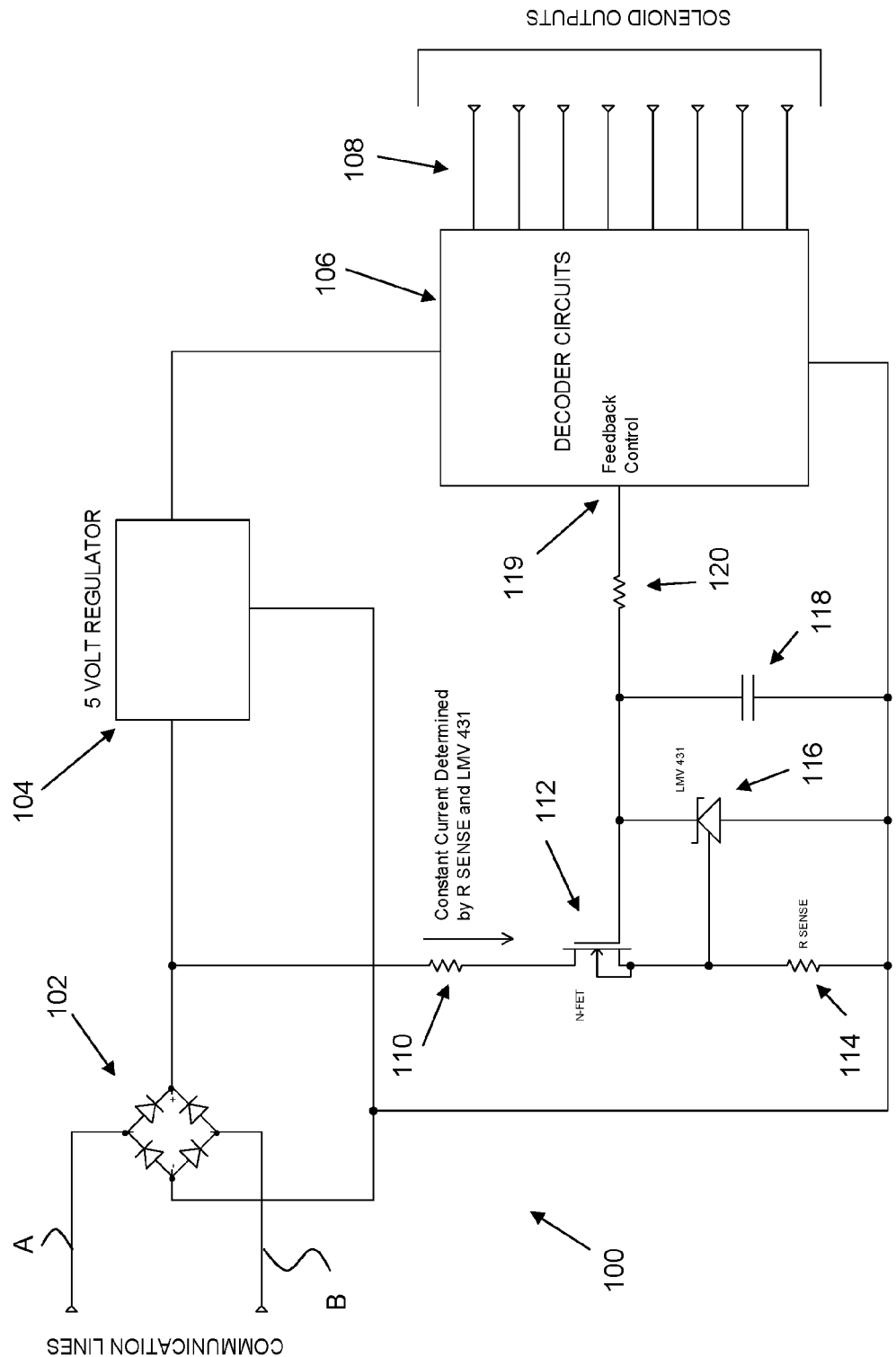
FIG. 3 illustrates a circuit diagram of a constant current circuit according to the present invention.

In one embodiment of the present invention seen in FIG. 3, the decoders (e.g., 22 and 24) include a current drawing circuit 100. This circuit 100 can draw a specific amount of current that is mostly unaffected by the voltage within a relatively large voltage range. In this respect, the system 10 can include more decoders (e.g., 22 or 24) and can space those decoders at greater distances from the gateway 16.

Generally, the circuit 100 is a constant current sink, which allows the circuit to draw a predetermined current that is generally independent of the voltage applied to it. Of course, it should be understood that extreme voltages, such as near-zero voltages will likely not allow for such a constant current draw.

Turning to the details of the circuit 100, power (e.g., 40 volt A.C. power) is provided on communications lines A and B, which connect either directly or indirectly to a bridge rectifier 102. The bridge rectifier 102 converts the A.C. power to D.C. power (e.g., 40 volt A.C. power to 40 volt D.C. power).

A 5 volt regulator 104 is connected to the bridge rectifier 102, stepping down the power to 5 volts to power the decoder circuits 106. The decoder circuits 106 can determine which water valves 26 to turn on or can receive sensor readings from sensor 28 via communication wires 108. Additionally, this 5 volts supplied to the decoder circuit can be used to power the valves 26 (e.g., solenoid valves) or power the sensors 28.

When the decoder circuit 106 determines that an acknowledgement signal (i.e., a predetermined current draw or pulse) should be activated, the decoder circuit 106 applies voltage (e.g., 5 volts) via its feedback control mechanism 119 for the desired length of the current draw. The feedback control mechanism 119 provides power to a resistor 120 and capacitor 118 to filter the voltage.

Next, this power from the feedback control mechanism 119 passes to a field effect transistor or FET 112, acting as a reference voltage to open a gate of the FET 112 and thereby allowing power from the bridge rectifier 102 (via resistor 110) to pass through. This power from the bridge rectifier 112 is then supplied to the R Sense resistor 114 (e.g., 5.8 ohms) and then to a shunt regulator 116 (e.g., LMV431 shunt regulator). The shunt regulator 116, then supplies an appropriate voltage to the gate of the FET 112, causing it to conduct the desired amount of current.

In this respect, a type of feedback loop is created, such that voltage across the R sense resistor 114 causes the FET 112 to be adjusted to draw an appropriate amount of current. Therefore, as the voltage along the wires A and B becomes lower due to increased resistance, the shunt regulator 116 adjusts the FET 112 to decrease resistance, causing the same amount of current to be drawn. Hence, a standard amount of current can be drawn despite unexpectedly low voltages being supplied via wires A and B.

Typically, two-wire power and communication systems typically include decoders that are installed in valve boxes below ground level or buried directly in the ground. Further, these decoders typically have long runs of wire that connect the decoders with the valves or sensors. This arrangement causes the decoders to be especially susceptible to electrical surges from lightning.

To combat lightning surges, system manufacturers generally recommend that external surge devices with ground rods be installed at short intervals along the two communications and power wires. Additionally, external surge devices with ground rods need to be installed on the decoder outputs to protect them from lightning surges. However, these grounding rods are typically expensive to purchase and install, making ideal grounding cost prohibitive.

Figure 4:
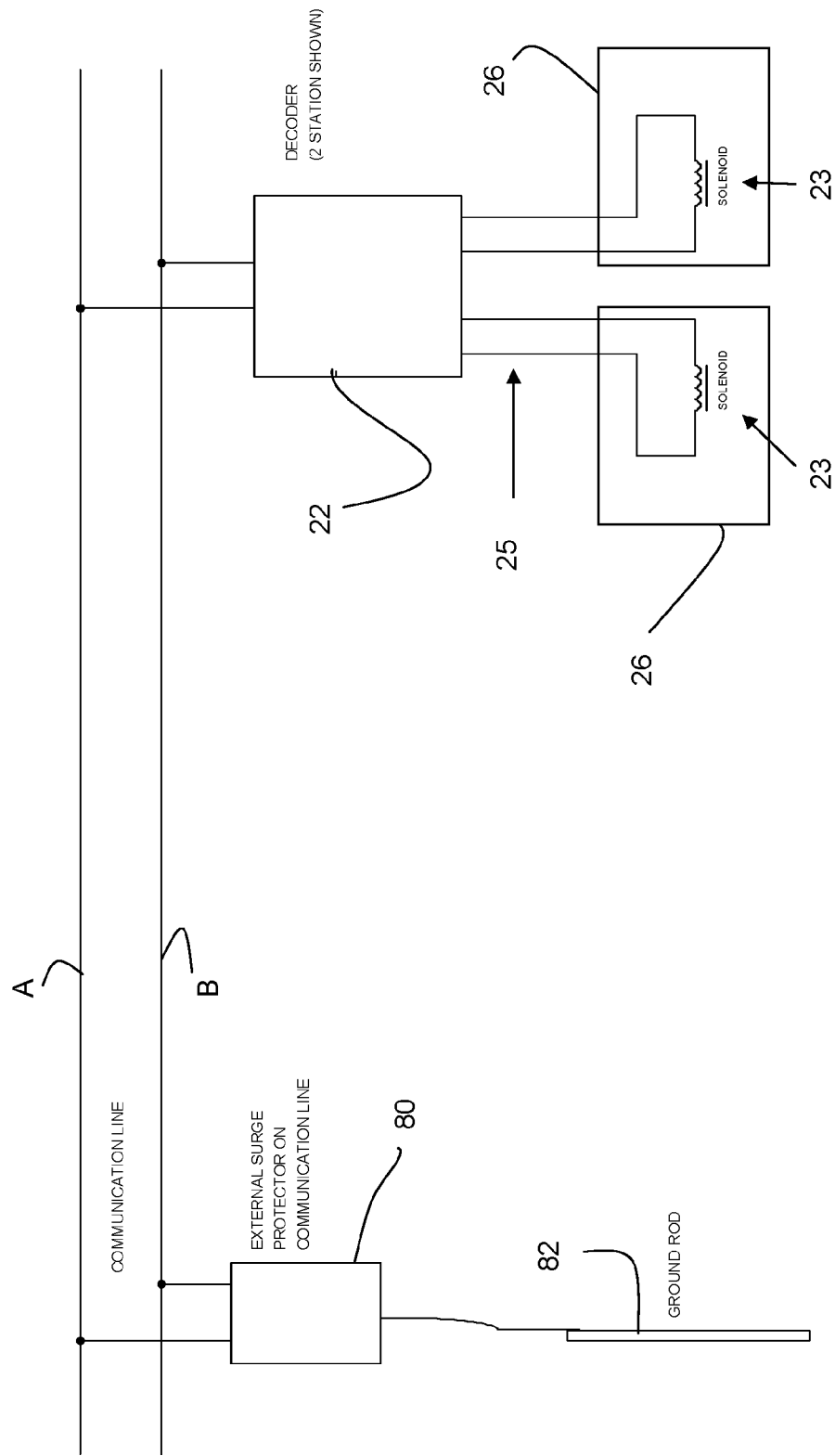
FIG. 4 illustrates a partial view of an external surge protector device and a decoder according to the present invention; and, FIG. 5 illustrates a circuit diagram of a decoder with internal surge protection according to the present invention.

FIG. 4 illustrates an example grounding arrangement according to the present invention in which surge protection is located within each decoder 22. In this respect, a system 10 may include fewer or even no external surge protectors and ground rods connected to the decoder output wires 25 (i.e., the output wires connecting the output of the decoder 22 with valves 26).

Figure 5:
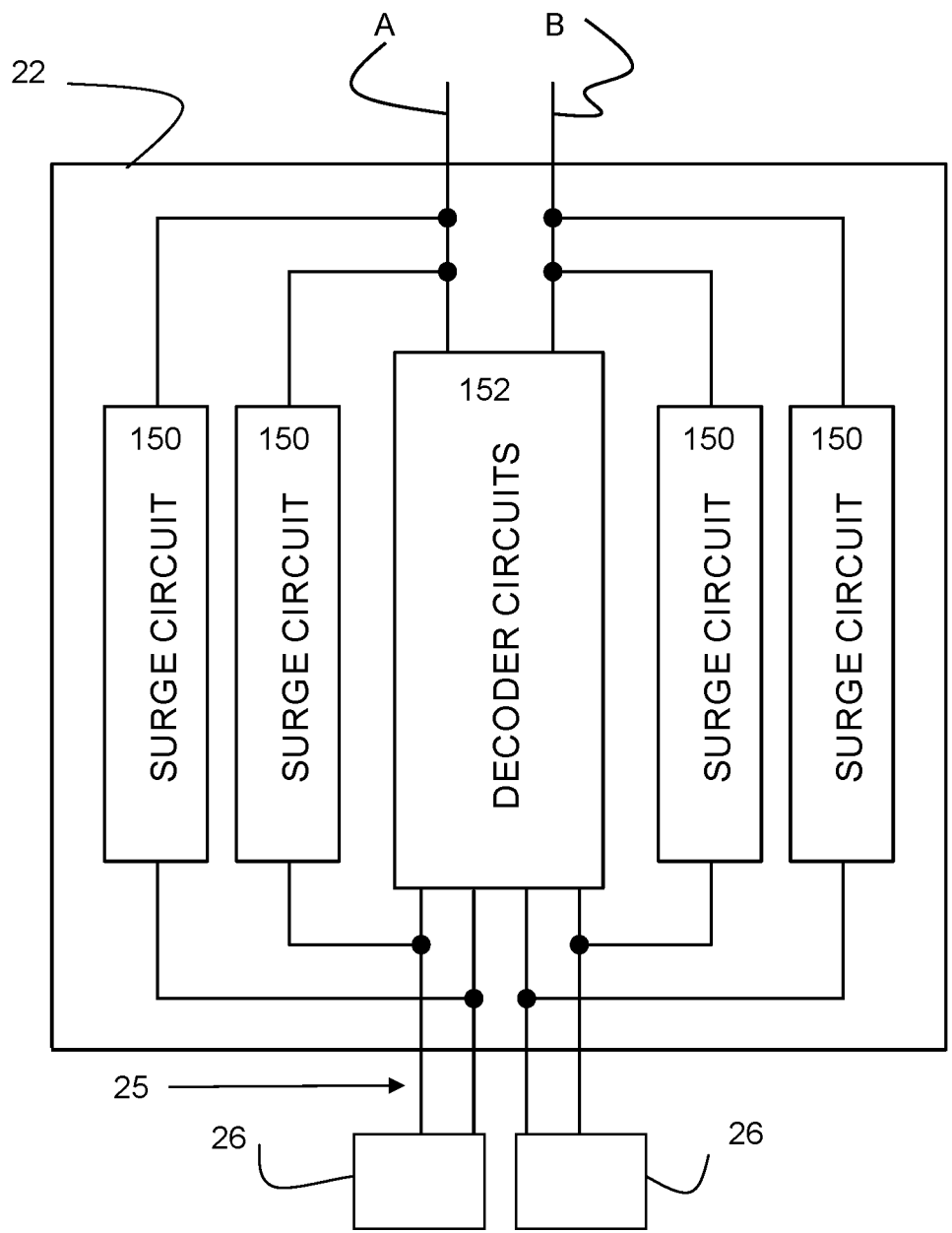

FIG. 5 illustrates an example schematic of a decoder 22 connected to two valves 26. Communication lines A and B are connected to the decoder 22 and conductive paths for each continue within the decoder 22, connecting to the decoder components 152 (e.g., including the previously described current drawing circuit 100).

Additionally, the decoder 22 includes a surge circuit 150 for each wire 25 connecting to the valves 26. In the present example, two valves 26 are present with two wires each. Hence four surge circuits 150 are included within the decoder 22. Each surge circuit 150 connects to a first location between the wires A or B and the decoder components 152; and to a second location on one of the wires 25 leading to the valve 26. In this respect, surge circuits 150 allow large electrical surges to bypass the decoder components that are typically sensitive to surges and expensive to replace.

In one example, the surge circuits 150 are composed of gas discharge tubes. These gas discharge tubes can be regarded as a very fast switch having conductance properties that change very rapidly, when breakdown occurs, from open-circuit to quasi-short circuit.

In another example, MOVs and TVS diodes can also be used as surge circuits 150. Additional example surge mechanisms can be found in U.S. Pat. Nos. 5,936,824; 5,909,349; 5,808,850; 5,500,782; 5,122,921; 4,851,946; 4,009,422; and 3,522,570, the contents of which are hereby incorporated by reference.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. An irrigation system comprising:
a decoder comprising decoder circuitry that:
receives power and communication signals over a wire pair from an irrigation interface that manipulates a potential across said wire pair;
said decoder circuitry controlling operation of a connected irrigation valve; and
said decoder circuitry drawing a predetermined current on said wire pair independently of a voltage on said wire pair.

2. The irrigation system of claim 1, wherein said decoder circuitry comprises a constant current sink.

3. The irrigation system of claim 2, wherein said decoder circuitry further comprises a field effect transistor.

4. The irrigation system of claim 3, wherein said decoder circuitry further comprises a shunt regulator arranged to control a resistance of said field effect transistor.

5. The irrigation system of claim 4, further comprising a feedback control mechanism for supplying an electrical signal to decrease a resistance of said field effect transistor.

6. The irrigation system of claim 5, wherein said field effect transistor and said shunt regulator comprise a feedback loop to regulate a level of said predetermined current.

7. The irrigation control system of claim 6, further comprising a resistor disposed between an output of said field effect transistor and an input of said shunt regulator.

8. An irrigation control system comprising:
an irrigation gateway configured for communication with an irrigation controller and electrically connectable first and second electrical communication paths; said irrigation gateway creating on said first and second electrical communication paths a potential that supplies power and communication data;
a decoder module comprising decoder circuitry that is electrically connectable to said first and second electrical communication paths to receive power and communication data; said decoder module further comprising a feedback circuit that operates to selectively draw a predetermined current on said first and second electrical communication paths.

9. The irrigation system of claim 8, wherein said feedback circuit is a constant current sink.

10. The irrigation system of claim 8, wherein said feedback circuit further comprises a field effect transistor.

11. The irrigation system of claim 10, wherein said feedback circuit further comprises a shunt regulator controlling a resistance of said field effect transistor on a current from said first and second electrical communication paths.

12. The irrigation system of claim 11, wherein said shunt regulator is arranged to control said resistance of said first and second electrical communication paths.

13. The irrigation system of claim 12, wherein said decoder module further comprises a decoder circuit and wherein first and second surge circuits provide an electrical path for high voltage current around said decoder circuit.

14. The irrigation system of claim 8, wherein said decoder module further comprises a first and second surge circuit.

15. The irrigation system of claim 14, wherein said decoder module further comprises a decoder circuit and wherein said first and second surge circuits provide an electrical path for high voltage current around said decoder circuits.

16. The irrigation system of claim 15, further comprising an external surge protector coupled to a ground rod and to said first and second electrical communication paths.

17. The irrigation system of claim 16, further comprising a plurality of decoders connected to said first and second electrical communication paths.

18. The irrigation system of claim 17, further comprising a plurality of valves connected to at least some of said decoders.

19. The irrigation system of claim 18, wherein said irrigation gateway creates alternating voltage signals on said first and second communication paths.

* * * * *